Aug. 11, 1959     J. E. JENNINGS     2,899,612
VACUUM VARIABLE FEED-THROUGH CAPACITOR
Filed Feb. 2, 1956
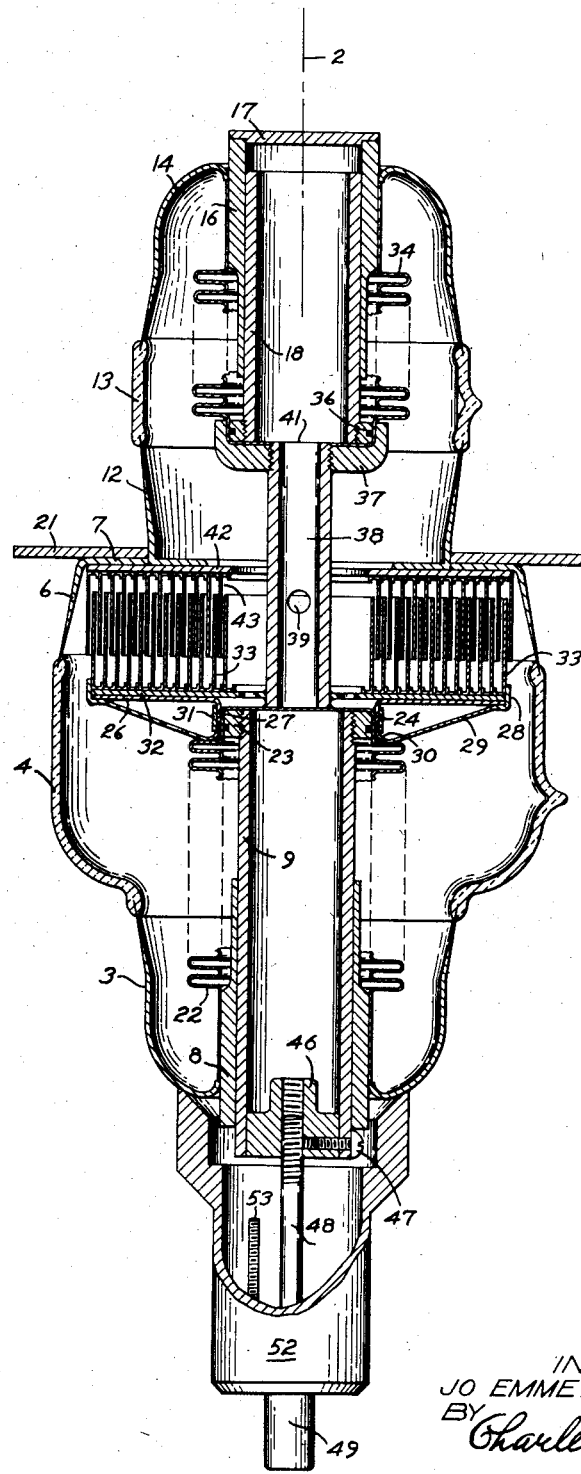
INVENTOR
JO EMMETT JENNINGS
BY
Charles S. Evans
his ATTORNEY

United States Patent Office 2,899,612
Patented Aug. 11, 1959

2,899,612

VACUUM VARIABLE FEED-THROUGH CAPACITOR

Jo Emmett Jennings, San Jose, Calif., assignor to Jennings Radio Manufacturing Corporation, San Jose, Calif., a corporation of California Application February 2, 1956, Serial No. 562,976

8 Claims. (Cl. 317—245)

My invention relates to vacuum feed-through capacitors; and the principal object of my invention is the provision of a variable capacitor of this type.

Another object of the invention is the provision in a capacitor of the type described of rigid mounting means for the fixed condenser plates so that vibration and its destructive effects are prevented, and the dissipation of heat is promoted.

Another object is the provision in an implement of the type described of widely spaced bearings in which the mobile structure carrying the movable condenser plates slide, thus giving rigidity and high precision to each adjustment and preventing vibration.

Another object of the invention is to provide in an implement of the described type, a mobile structure in which bearing surfaces are suitably hard and wear-resistant, while providing an integral connection of extremely high electrical conductivity between terminals.

Another object is the provision in a feed-through capacitor of means for trapping any high frequencies which may be carried simultaneously with direct current or lower frequencies.

My invention possesses other objects, some of which will be brought out in the following description of the invention. I do not limit myself to the showing made by the said description and the drawings, since I may adopt variant forms of the invention within the scope of the appended claims.

Referring to the drawings, the figure is a sectional view taken in a plane coincident with the long axis of the capacitor. The scale is approximately three-fourths the size of one of my larger units, although some of the thin parts such as the condenser plates are shown out of true scale for clarity.

In terms of broad inclusion, the structure of my variable feed-through capacitor comprises a vacuumized envelope made in two sections, large and small, which are arranged end-to-end upon an oppositely flanged conductive junction ring. The free end of each section is formed with a conductive cap or terminal electrode, separate from the junction ring by an insulating glass shell forming a major part of the envelope. The terminal electrodes are integrally connected mechanically and electrically by an expensible conductive structure upon which the mobile condenser plates are carried. Included in the expansible structure are axially alined shafts or stems slidable in bearings fixed rigidly in the conductive terminal electrodes. The fixed condenser plates are mounted in the large section on a base plate brazed to the junction ring so that the two reenforce each other; and these are further strengthened by a conductive annular flange on the outside of the small section and brazed to the junction ring. This flange thus constitutes an electrostatic or magnetic shield between the terminals, and a convenient means for mounting the implement in a supporting panel and connecting it to a low inductance ground plate.

The expansible structure also includes a conductive bellows brazed to the terminal electrode inside each end of the implement, and hermetically enclosing the slidable stem and bearing at that end. Within the large section, the interior of the bellows is in communication with the atmosphere so that the bellows normally tends to expand and move the mobile plates into position of maximum capacitance. Screw means external to the envelope are utilized to counter the inward thrust of the atmosphere, and adjust and retain the mobile plates in the desired setting.

Within the small section of the envelope, the interior of the bellows is in communication with the vacuumized interior of the envelope, so that it acts only as a flexible or expansible continuous conductive connection in the expansible structure connecting the two terminals.

In general, the purpose of my feed-through capacitor is to carry high radio frequency currents through the expansible structure from terminal 3 to terminal 14, while suppressing harmonics, parasitics, or undesirable frequencies, not of the fundamental frequency, and preventing them from passing from one stage to another or carrying through to a power supply source. For the undesirable radio frequency currents, generally of the high frequency type, my capacitor may be said to act electrically as a short circuit device, providing a radio frequency by-pass to ground through the flange 21. If the reactance of the capacity at the particular operating frequency of the circuit involved is but a few ohms, practically all of the energy of the current will go to ground and not into the next circuit. Since the capacity, when properly adjusted, represents a relatively high quantity in ohms with reference to the operating frequency nearly all of the desirable power is allowed to pass through the unit. My capacitor is capable of close adjustment to the capacity value which is most effective in the circuit, and is capable of carrying high values of radio frequency current at high voltage.

In detail my vacuum variable feed-through capacitor comprises a generally cylindrical vacuumized envelope made up of two permanently connected large and small sections, the whole arranged concentrically about a central axis 2. The large section of the envelope is formed with a copper end cap 3, constituting one of the two terminal electrodes of the capacitor. This is connected by the glass bulb 4 to the copper flange or anode 6, extending from the periphery of the conductive junction ring 7, which may be considered structurally as the main foundation element for the entire structure.

Concentrically arranged within the end cap or terminal 3 and integrally united therewith, as by brazing, is the bearing tube 8, extending well into the envelope so as to provide an ample slide bearing surface for the hollow shaft or stem 9, which extends roughly to about the central point of the envelope.

On the opposite side of the junction ring 7 is the smaller section of my feed-through condenser, carried on the smaller diameter flange or anode 12, brazed to the junction ring and joined by the glass bulb 13 to the end cap or terminal 14, within which is brazed the concentric bearing tube 16.

Unlike the outer end of the large section bearing tube 8, which is open to atmospheric pressure, the outer end of the bearing tube 16 is hermetically closed by end wall 17. Slidably disposed within the bearing tube 16 is a hollow shaft or stem 18, open at its outer end, and axially aligned with the stem 9 in the large section.

An annular conductive flange 21 is brazed to the junction ring around the anode 12 to heavily reenforce the structure at this point. This flange also serves as a magnetic or electrostatic shield as well as providing a central mounting for the capacitor in a supporting panel. It is generally connected to a bulkhead, wall, or low inductance ground plate.

Within the larger section, an expansible bellows 22 is brazed at its outer end to the bearing tube 8, which it surrounds; and at its inner end it is brazed to a heavy flange 23 and across the open end of the stem 9, on which the flange is rigidly fixed, so that an annular shoulder 24 is formed around the closed inner end of the bellows. The interior of the bellows is in communication with the atmosphere through the space between the stem and bearing tube; and therefore atmospheric pressure tends to expand the bellows into the vacuumized envelope carrying with it the hollow stem and connected structure. Both stem and bearing tube are therefore made of hard and wear-resistant brass, to give long life to these mechanically operative parts. The bellows also provides a capacious continuous or integral electrical conductor between the mobile stem and the adjacent terminal 3, and is therefore made of a metal such as copper or one of its alloys, of high electrical conductivity.

Brazed into the shoulder 24 and therefore stably but slidably supported on the stem and bearing tube; and integrally connected to the thermal 3 through the bellows, is the conical crown structure which carries the mobile cylindrical condenser plates of my capacitor.

The crown structure comprises a flat annular crown plate 26 formed with the inner peripheral cylindrical flange 27 fitting over the bellows shoulder. The outer periphery of the crown plate seats within the flange 28 on the outer edge of the conical truss plate 29, the inner edge of which is curved inwardly in the flange 30 to seat on the shoulder 24 against the first bellows corrugation. The two flanges 27 and 30 are brazed around the shoulder so that an integral union is formed with the bellows and the crown structure is rigidly supported by the stem 9. A spelter retaining metal sleeve 31 is utilized in the brazing procedure.

Overlying and brazed to the crown plate and also seated within the flange 28 is a base plate 32, on which a concentric assembly of closely spaced flanged condenser plates 33 is brazed as shown. The base plate with the flanged condenser plates brazed on one side and the crown plate brazed on the other side; and the whole stiffened by the truss plate, presents an extremely rigid but relatively light integral structure in which vibration is so nearly absent as to be negligible.

Within the small section of my capacitor is a structure, similar in many respects to that just described. Surrounding the bearing tube 16 and its enclosed shaft or stem 18, and brazed at its outer end to the bearing tube and at its inner end to the stem is a bellows 34. The end of the stem is provided with a heavy flange 36; and the inner end of the bellows seats between this flange and the heavy copper cap 37; cap, bellows end, flange 36 and stem end being brazed into an integral assembly.

Means of high conductivity are provided for rigidly and integrally connecting the two stems 9 and 18 into one mobile assembly, concentric about the central axis 2 and rigidly mounting the condenser plates 33 at about its mid point. Threaded and brazed at one end concentrically into the copper cap 37 is a heavy gauge copper tube 38, which at its other end extends through the base plate 32 and seats on the head of the bellows, being brazed to both so that it is rigidly connected into the crown structure.

The copper tube is provided with a vent 39; and the head of the bellows over the stem 18 is apertured at 41, so that the interior of the bellows 34 is in communication with the interior of the envelope through a passage including the space between bearing tube and stem, hollow stem, copper tube and vent 39.

So constructed and vented, the bellows 34 is not subject to atmospheric pressure, and therefore is not in opposition to bellows 22. It serves only as a continuous or integral electrical conductor between the central mobile assembly and the adjacent terminal electrode 14, just as the other bellows 22 serves a similar electrical function between the central mobile assembly and its adjacent terminal electrode 3.

Brazed against the inside face of the junction ring 7 is a base plate 42, on which is brazed an assembly of fixed condenser plates 43 concentric with the axis 2 and anode or flange 6. These fixed plates are spaced to be interleaved at extremely close spacing with the mobile plates; and it is noted that the junction ring and back plate, surmounted by the shield flange 21, provide an exceedingly rigid and stable mounting for the laterally extending anode flanges 6 and 12, and their respective supported sections; and at the same time provide an immediately adjacent extensive radiating surface for the dissipation of heat generated during operation of the capacitor.

From the above it will be clear that concentric with the axis of the implement an assembly of movable condenser plates is closely interleaved within a vacuumized envelope, with an assembly of fixed condenser plates; and that the movable plates are carried upon a concentric mobile structure continuous by integral but expansible connection with the opposite terminal electrodes 3 and 14, and supported for great stability between widely spaced slide bearings, one on each side of the condenser plates in the adjacent terminal electrode.

Means outside the vacuumized envelope are provided for moving the mobile structure to adjust the amount of interleaving between the plates to secure the capacitance which is most effective in the circuit. Plugging the outer end of the stem 9 is a block 46, held in place by a screw, the head 47 of which forms a stop to limit the inward movement of the stem by impingement against the outer end of the bearing tube 8, thus fixing the inmost setting of the mobile plates and the maximum capacitance of the implement.

Threaded through the block is an adjusting screw 48, on the outer end of which a turning knob 49 is fixed. A ball bearing is interposed between the knob and a thimble 52, bearing on the terminal anode 3 around the ends of the bearing tube 8 and stem 9. By turning the knob in one direction the entire mobile structure may be drawn out to any desired setting of the mobile condenser plates, the long screw 53 fixed at one end in the thimble, acting as a stop to limit maximum withdrawal. Turning the knob in the other direction feeds the mobile structure into the envelope, atmospheric pressure keeping it tight against the restraining threads of the screw 48 and holding it with inward pressure at the exact point of adjustment.

I claim:

1. A vacuum variable feed-through capacitor comprising a vacuumized envelope having conductive ends constituting terminal electrodes and a conductive intermediate portion insulated from said terminal electrodes, an expansible conductive structure including a metallic bellows within the envelope integrally connecting the terminal electrodes, an assembly of fixed condenser plates mounted in the envelope on said intermediate portion thereof, an assembly of mobile condenser plates interleaved with the fixed plates and mounted on the expansible structure, and means external to the envelope for moving the expansible structure.

2. A vacuum variable feed-through capacitor comprising a vacuumized envelope having conductive ends constituting terminal electrodes and a non-conductive portion interposed therebetween to retain the terminal electrodes in spaced relation, a bearing tube integral with each terminal electrode and extending into the envelope, a stem slidably journaled in each bearing tube, an assembly of fixed condenser plates mounted in the envelope and insulated from said terminal electrodes by said non-conductive portion of the envelope, an assembly of mobile condenser plates interleaved with the fixed plates and mounted on one of the stems, a pair of conductive bellows within the envelope each bellows at one end integrally united to the adjacent stem and at the other end integrally united to the adjacent terminal electrode, a conductive shaft integrally connecting the two bellows and their adjacent stems, and means external to the envelope for moving the stem mounting the mobile plates.

3. A vacuum variable feed-through capacitor comprising a vacuumized envelope having ends constituting terminal electrodes and a conductive intermediate portion insulated from said terminal electrodes, an expansible conductive structure including a metallic bellows within the envelope integrally connecting the terminal electrodes, an assembly of fixed condenser plates mounted in the envelope, a conductive flange surrounding the envelope on the exterior thereof and integrally connected with the assembly of fixed condenser plates and said intermediate conductive portion of the envelope, an assembly of mobile condenser plates interleaved with the fixed plates and mounted on the expansible structure, and means external to the envelope for moving the expansible structure.

4. A vacuum variable feed-through capacitor comprising a vacuumized envelope having conductive ends constituting terminal electrodes and having non-conductively spaced intermediate thereof a conductive annular flange extending into the envelope and also extending outwardly of the envelope, an assembly of fixed condenser plates mounted on the inwardly extending flange, an expansible conductive structure radially spaced from and extending through the annular flange within the envelope and integrally connecting the terminal electrodes, said expansible conductive structure including a metallic bellows, an assembly of mobile condenser plates interleaved with the fixed plates and mounted on the expansible structure, and means external to the envelope for moving the expansible structure.

5. A vacuum variable feed-through capacitor comprising a vacuumized envelope having ends constituting terminal electrodes and conductive and non-conductive intermediate portions, a bearing tube having an hermetically closed outer end integrally mounted in one of said terminal electrodes and being vented into the envelope, a bearing tube having an open outer end integrally mounted in the other terminal electrode, a stem slidably journaled in each bearing tube, a bellows surrounding each bearing tube and integrally connecting the tube to the adjacent stem, an assembly of fixed condenser plates mounted in the envelope on a conductive intermediate portion and insulated from said terminal electrodes by said non-conductive intermediate portions, an assembly of mobile condenser plates interleaved with the fixed plates and mounted on the inner end of the stem in the open bearing tube, a conductive shaft integrally connecting the two stems, and a screw spindle exterior to the envelope and operatively engaged with the stem in the open bearing tube to effect sliding movement of the stem.

6. A vacuum variable feed-through capacitor comprising a vacuumized envelope having ends constituting terminal electrodes and including axially spaced glass shells and an intermediate conductive portion hermetically united to both shells, a bearing tube having an hermetically closed outer end integrally mounted in one of said terminal electrodes and being vented into the envelope, a bearing tube having an open outer end integrally mounted in the other terminal electrode, a stem slidably journaled in each bearing tube, a bellows surrounding each bearing tube and integrally connecting the tube to the adjacent stem, an assembly of fixed condenser plates mounted in the envelope and insulated from said terminal electrodes by said glass shells, an assembly of mobile condenser plates interleaved with the fixed plates and mounted on the inner end of the stem in the open bearing tube, a conductive shaft integrally connecting the two stems, an exterior conductive flange extending from the envelope intermediate its ends and integral with said conductive intermediate portion of the envelope and the fixed condenser plates within the envelope, and a screw spindle exterior to the envelope and operatively engaged with the stem in the open bearing tube to move the mobile condenser plates.

7. A feed-through capacitor comprising a small and a large generally cylindrical section disposed end-to-end about a central long axis to form a vacuumized envelope, the free end of each section constituting a terminal electrode and having a concentric flange extending toward the other terminal electrode, the adjacent ends of the sections being formed by a conductive annulus having a concentric flange on each side extending toward the adjacent concentric terminal flange, a concentric dielectric shell arranged between the mutually reaching flanges of each section and hermetically sealed therewith, a series of condenser plates fixedly mounted in the large section on the conductive annulus, a series of mobile condenser plates in the large section interleaved with the fixed plates, a bearing tube integrally mounted in each terminal electrode, a stem slidable in each bearing tube, a bellows in each section integrally united at one end with the bearing tube and at its other end with the adjacent stem, means hermetically closing the outer end of the bearing tube in the small section, said bearing tube being vented into the envelope, means for mounting the mobile condenser plates on the stem of the larger section, a feed-through shaft integrally connecting adjacent ends of the two stems, and means external to the envelope for moving the stem in the larger section.

8. A feed-through capacitor comprising a small and a large generally cylindrical section disposed end-to-end about a central long axis to form a vacuumized envelope, the free end of each section constituting a terminal electrode and having a concentric flange extending toward the other terminal electrode, the adjacent ends of the sections being formed by a conductive annulus having a concentric flange on each side extending toward the adjacent concentric terminal flange, a conductive annular flange integrally united with the annulus and constituting a shield between the two terminals and also a ground membrane for the capacitor, a concentric dielectric shell arranged between the mutually reaching flanges of each section and hermetically sealed therewith, a series of condenser plates fixedly mounted in the large section on the conductive annulus, a series of mobile condenser plates in the large section interleaved with the fixed plates, a bearing tube integrally mounted in each terminal electrode, a stem slidable in each bearing tube, a bellows in each section integrally united at one end with the bearing tube and at its other end with the adjacent stem, means hermetically closing the outer end of the bearing tube in the small section, said bearing tube being vented into the envelope, means for mounting the mobile condenser plates on the stem of the larger section, a feed-through shaft integrally connecting adjacent ends of the two stems, and means external to the envelope for moving the stem in the larger section.

References Cited in the file of this patent

UNITED STATES PATENTS

| | | |
|---|---|---|
| 2,135,338 | Higgins | Nov. 1, 1938 |
| 2,368,278 | Warshaw | Jan. 30, 1945 |
| 2,575,726 | Peck | Nov. 20, 1951 |
| 2,740,077 | Clarke | Mar. 27, 1956 |

FOREIGN PATENTS

| | | |
|---|---|---|
| 630,259 | Great Britain | Oct. 10, 1949 |